United States Patent [19]

Ideta

[11] 4,359,869
[45] Nov. 23, 1982

[54] HYDRAULIC POWER BOOST APPARATUS

[75] Inventor: Yasufumi Ideta, Tokyo, Japan

[73] Assignee: Nissan Motor Co., Ltd., Yokohama, Japan

[21] Appl. No.: 173,316

[22] Filed: Jul. 29, 1980

[30] Foreign Application Priority Data

Aug. 2, 1979 [JP] Japan .................. 54-106057[U]

[51] Int. Cl.³ .................. F15B 9/10; F15B 13/10
[52] U.S. Cl. .................. 60/547 B; 60/552;
60/554; 91/378; 91/391 R
[58] Field of Search .................. 91/378, 391 R, 422,
91/431, 369 A; 60/547 B, 554, 552, 553, 547 R

[56] References Cited

U.S. PATENT DOCUMENTS

| 3,132,567 | 5/1964 | Ingres et al. ............ 91/369 A |
| 3,133,473 | 5/1964 | Garrison et al. ............ 91/378 |
| 3,691,903 | 9/1972 | Shellhause ............ 91/369 A |
| 3,782,781 | 1/1974 | Lewis . | |
| 3,951,043 | 4/1976 | Keady ............ 91/372 |

FOREIGN PATENT DOCUMENTS

| 2001680 | 7/1970 | Fed. Rep. of Germany . |
| 1917954 | 10/1970 | Fed. Rep. of Germany ........ 91/378 |
| 2012472 | 10/1971 | Fed. Rep. of Germany ........ 91/378 |
| 2834510 | 7/1979 | Fed. Rep. of Germany . |
| 2078014 | 11/1971 | France . |
| 2086204 | 12/1971 | France . |
| 2233206 | 1/1975 | France . |
| 2237787 | 2/1975 | France . |
| 2275667 | 1/1976 | France . |
| 556725 | 10/1943 | United Kingdom . |
| 580283 | 9/1946 | United Kingdom . |
| 1254081 | 11/1971 | United Kingdom . |
| 1283885 | 8/1972 | United Kingdom . |
| 1436187 | 2/1974 | United Kingdom . |
| 2003564 | 3/1979 | United Kingdom . |

Primary Examiner—Paul E. Maslousky
Attorney, Agent, or Firm—Thompson, Birch, Gauthier & Samuels

[57] ABSTRACT

A hydraulic power boost apparatus for use with the braking system of an automotive vehicle includes a power piston cooperating with a slide valve to define a plurality of spool valves to regulate the flow of a pressurized fluid therethrough to selectively apply the fluid to boost the force applied to the power piston. A resilient member is positioned within the power piston blind bore to modulate the force transmitted from the slide valve to the power piston. The power piston also includes an annular ridge for engaging a mating annular ridge of the slide valve to limit the travel of the slide valve to prevent the resilient member from being deformed beyond its elastic limit.

10 Claims, 7 Drawing Figures

HYDRAULIC POWER BOOST APPARATUS

BACKGROUND OF THE INVENTION

1. Field of the Invention

The present invention relates generally to a hydraulic power boost apparatus for use with an automotive vehicle, and more specifically to a hydraulic power boost apparatus having a means for limiting the travel of the slide valve within the apparatus to prevent damage to the resilient power cushion positioned within the apparatus.

2. Description of the Prior Art

Various hydraulic power boost mechanisms are known to generally comprise a booster housing in substantially cylindrical form, a power piston sealingly and slidably disposed within the booster housing and a spool valve disposed within the power piston and connected to the brake pedal. The power piston is formed with a plurality of annular recesses in the internal bore thereof. The spool valve is also formed with a plurality of annular recesses on the outer periphery thereof. Each of the power piston internal bore recesses cooperates with the spool valve outer recesses to selectively regulate the flow of hydraulic fluid therethrough. In such a hydraulic power boost mechanism, by applying the brake pedal, pressure fluid flows into the booster housing through an inlet port and into a pressure chamber formed therein. The accumulated fluid pressure shifts the power piston to actuate a power transmitting rod connected to a tandem brake master cylinder. When the brake pedal is applied to a predetermined force, the spool valve engages the bottom of the power piston so that force applied to the brake pedal is directly transmitted to the power piston. At this time, the spool valve interrupts communication between the inlet port and the outlet port.

In the conventional hydraulic power boost mechanism, if the brake pedal is applied with a force in excess of the predetermined force, the spool valve first closes communication between the inlet port and the pressure chamber and thereafter engages the bottom of the outlet port and establish communication between the inlet port and the power piston. Between the point of closing the spool valve and the bottoming out point, there is a loss stroke. Specifically, when the spool valve reaches the position where the first valve just completely closes, a clearance remains between the top of the spool valve and the bottom of the power piston bore. Thereafter, when the boost pressure is fully applied to the power piston, the spool valve still moves slightly within the piston bore until it reaches the bottom. The foot force is then directly transmitted to the brake tandem master cylinder with a corresponding reaction force applied to the brake pedal. This increases the braking "back force" directed to the driver's foot.

For preventing the above-mentioned disadvantages, there have been proposed improved hydraulic power boost mechanisms having a resilient member within the bottom of the power piston. The thickness of the resilient member corresponds to a dimention of loss stroke of the spool valve during which the spool valve travles to the bottom of the piston under no reactance force. In such a construction, when the spool valve just closes the communication between the inlet port and outlet port, the top of the spool valve engages the resilient member to thereby shift the power piston. Until the resilient member is fully deformed, the force applied to the master cylinder and the reaction force to the brake pedal are gradually and moderately increased.

In this construction however, the resilient member can prevent the brake system from rapidly increasing the braking force. Also, the resilient member is apt to be damaged by repeated deformation or by being deformed beyond its resilient limit, since the size of the resilient member is limited by the relatively narrow space within the power piston. This will decrease the durability of the boost mechanism and require frequent replacement of the resilient member.

SUMMARY OF THE INVENTION

The hydraulic power boost apparatus of the present invention is formed with a resilient member positioned within the power piston blind bore to engage the end of the spool valve as the spool valve shifts therein to shift fluid flow through the apparatus to controlably apply the pressurized fluid to boost the force applied to the power piston. An annular ridge is provided to limit the travel of the spool valve so that the resilient member will not be deformed beyond its elastic limit.

BRIEF DESCRIPTION OF THE DRAWINGS

The present invention will become more fully understood from the detailed description given below, and from the accompanying drawings of the preferred embodiment of the present invention, which, however, are not to be limitative of the present invention in any way, but are for the purpose of elucidation and explanation only.

In the drawings.

DESCRIPTION OF THE PREFERRED EMBODIMENTS

Figure 1:
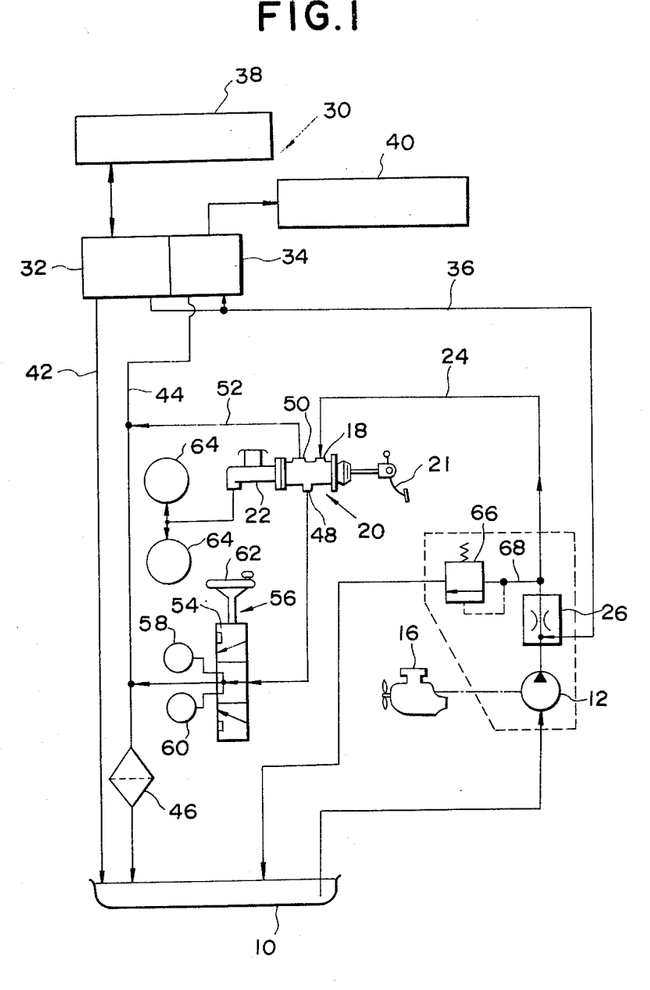
FIG. 1 is a diagramatical illustration of a hydraulic system to be applied to a fork lift truck employing a hydraulic booster according to the present invention.

Referring now to the drawings, particularly to FIG. 1, there is illustrated a general construction of a hydraulic system used on a fork-lift truck or the like. Working fluid is generally stored in a fluid reservoir 10. A fluid pump 12 communicates with the fluid reservoir 10 through a fluid suction passage 14. The fluid pump 12 is mechanically connected to an engine 16 such as an internal combustion engine to be driven thereby. The fluid pump 12 pressurizes the working fluid and feeds it to an inlet port 18 of a hydraulically operative boost mechanism 20. The hydraulic booster 20 cooperates with a brake pedal 21 and with a braking system master cylinder 22.

In a fluid passage 24 connecting the fluid pump 12 to the hydraulic booster inlet port 18, there is provided a flow-priority valve 26. Through the flow-priority valve 26, the working fluid is also fed to a working section of the vehicle, for example, a lifter operating system 30, via a passage 36.

The hydraulic lifter system 30 comprises control valves 32 and 34, communicating with a lifting cylinder 38 for lifting a fork of the vehicle (not shown), and a tilting cylinder 40 for tilting the fork to up the free end thereof, respectively. By shutting off the valves 32 and 34 and thereby stopping fluid pressure, the cylinders 38 and 40 return to inoperative position by gravity. Working fluid applied to the cylinders is then exhausted from the cylinders to the fluid reservoir 10 through the control valves and drain passages 42 and 44. Within the drain passage 44, there is provided with a micron-filter 46 for cleaning the working fluid flowing therethrough.

The working fluid applied to the hydraulic booster 20 is exhausted from outlet and exhaust ports 48 and 50 and communicates with the drain passage 44 through respective drain passages 52 and 54. Between the drain passage 44 and the booster outlet port 48 there is interposed an operation valve 54 of a hydraulically operative power steering system 56. The power steering system generally comprises the operation valve 54, a pair of working sections 58 and 60 operative by pressurized fluid. When a driver operates the operation valve steering wheel 62, the working fluid is applied to either of the working sections 58 or 60 to operate the vehicle steering mechanism.

The brake master cylinder 22 has its own independent hydraulic system different from the system illustrated herewith. By applying brake pedal force and providing boosting force from the hydraulic booster, the master cylinder 22 operates to apply pressurized fluid to each of the vehicle wheel braking discs 64.

Further, the flow-priority valve 26 communicates with a relief valve 66 through a fluid passage 68. The relief valve 66 adjusts the hydraulic pressure applied to the hydraulic booster 20. When the fluid pressure flowing through the passage 24 exceeds a given amount, the pressurized fluid is drained through the relief valve 66 and a return passage 70 to the fluid reservoir 10.

As stated hereinabove, the hydraulic power booster 20 is connected to the hydraulic fluid pump 12 and to the steering system operation valve 54. The hydraulic booster 20 includes a generally cylindrical-shaped housing 102 having an inlet port 18, outlet port 48 and drain port 50. The inlet port 18 communicates with the outlet of the fluid pump 12 through the flow-priority valve 26 and therefore, the pressurized fluid is applied to the hydraulic booster therethrough. Upon delivering the pressurized fluid to the hydraulic booster 20, the relief valve 66 regulates the fluid pressure to a predetermined level. At the same time, the pressurized fluid is also fed to the lifter operating system control valves 32 and 34.

The hydraulic booster fluid is normally drained through the housing drain port 50 during application of the brake pedal 21. The outlet port 48 drains the excess fluid therethrough when the boost force applied to the brake master cylinder 22 exceeds a predetermined amount. When the brake pedal is released, the pressure fluid flows from the inlet port 18 to the outlet port 48. The pressure fluid exhausted from the outlet port 48 is fed to the steering system operation valve 54.

Figure 2:
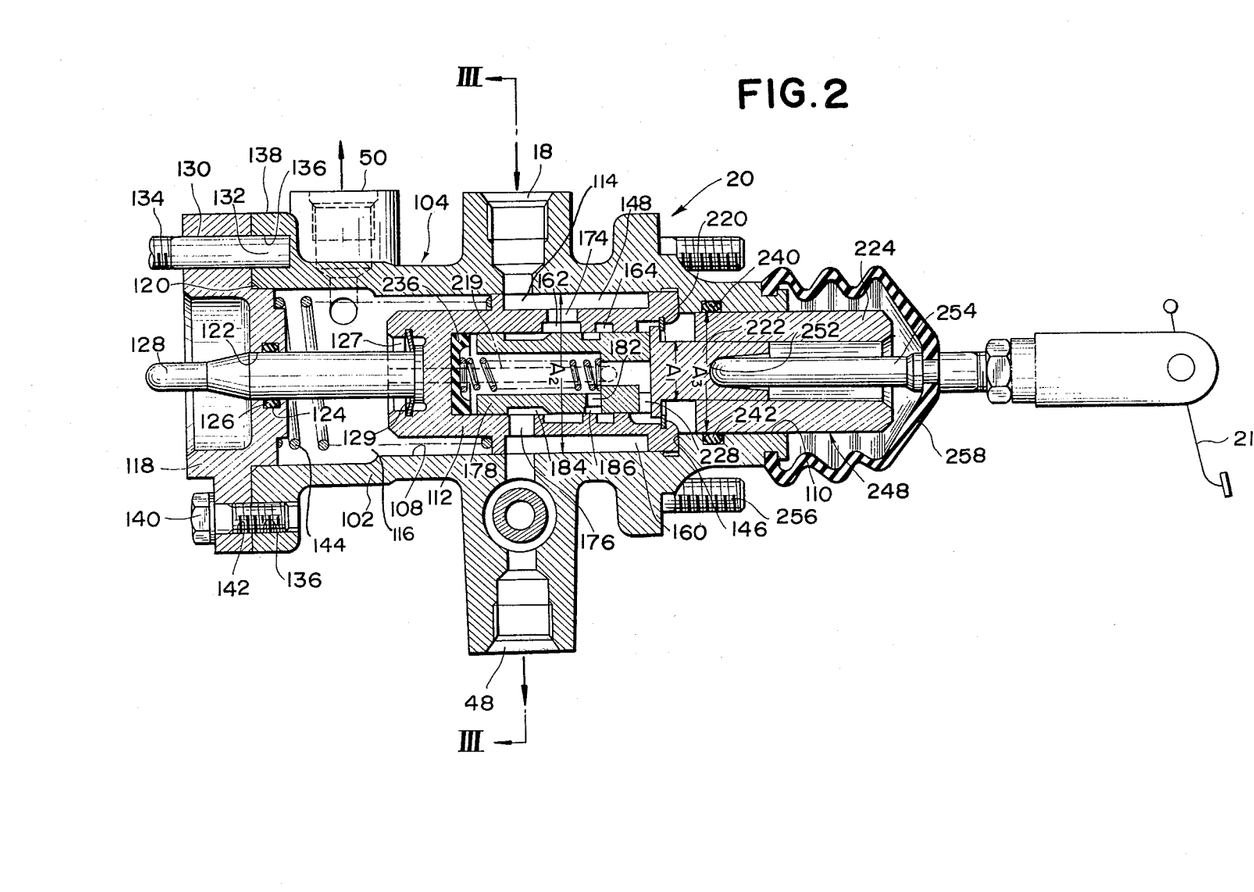
FIG. 2 is a longitudinal sectional view of the preferred embodiment of the hydraulic booster in accordance with the present invention.

As best shown in FIG. 2, the booster housing 102 includes a stepped bore having two portions 108 and 110. The bore 108 slidably receives a cylindrical-shaped power piston 112 to divide the bore into a pressure chamber 114 and an exhaust chamber 116. A plug 118 with an annular sealing member 120 sealingly closes the end of the bore 108 adjacent the exhaust chamber 116. The plug 118 is provided with a central opening 122 having an internal annular groove 124 which receives an annular sealing member 126 through which a force transmitting rod 128 slidingly projects to connect the piston 112 to a tandem brake master cylinder 22.

Figure 3:
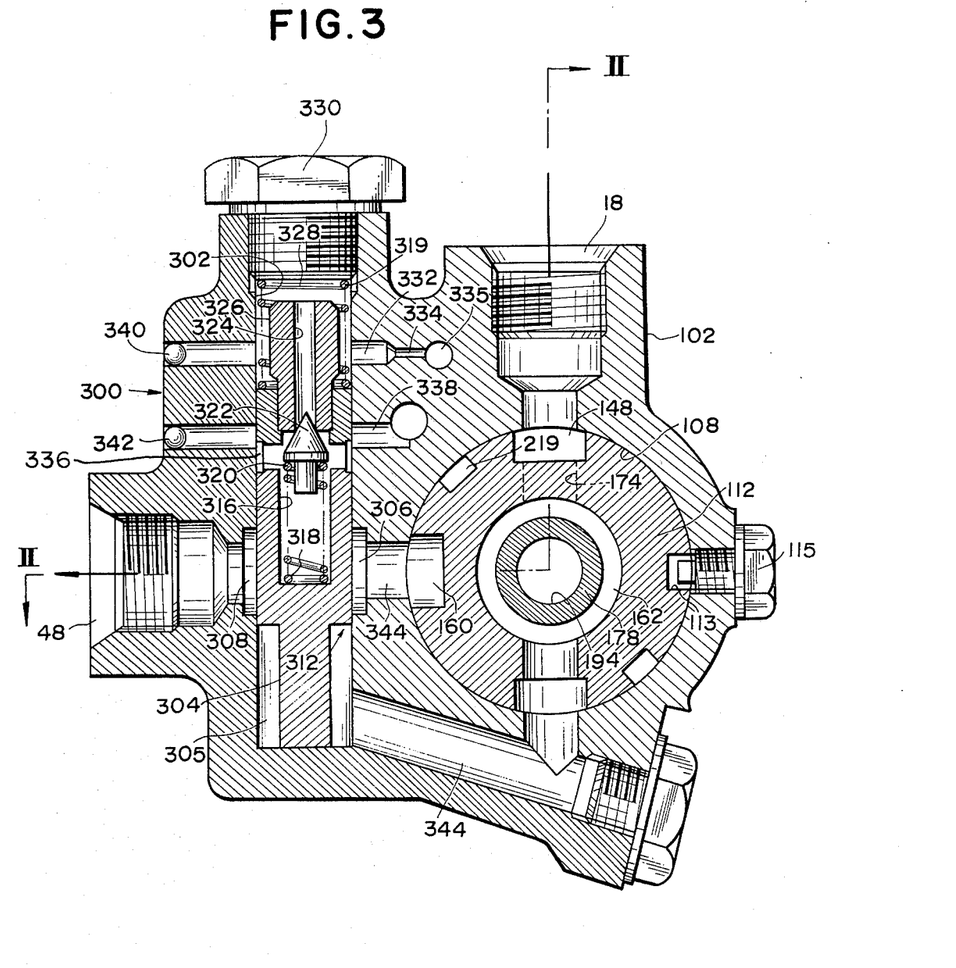
FIG. 3 is a cross-sectional view of the hydraulic booster of FIG. 2 taken along line III—III of FIG. 2.

The end of the power piston 112 adjacent the exhaust chamber 116 is formed with a groove 127. An annular snap ring 129 retains the power transmitting rod 128 in position with the power piston 112. As shown in FIG. 3, the power piston 112 is further formed with a longitudinal channel 113 on the outer periphery thereof. A bolt 115 projects inwardly from the booster housing 102 to prevent the piston 112 from rotating.

A piston return spring 144 is disposed in the housing exhaust chamber 116 to urge the piston 112 toward the pressure chamber 114 to the right in the drawings against a housing internal annular surface 146. The piston 112 is formed with longitudinal channels 148 and 160 on the outer periphery thereof. The channels 148 and 160 are located in a plane transverse to the piston axis and are positioned adjacent respective inlet and outlet ports 18 and 48, to communicate therewith under all conditions of operation.

Figure 5:
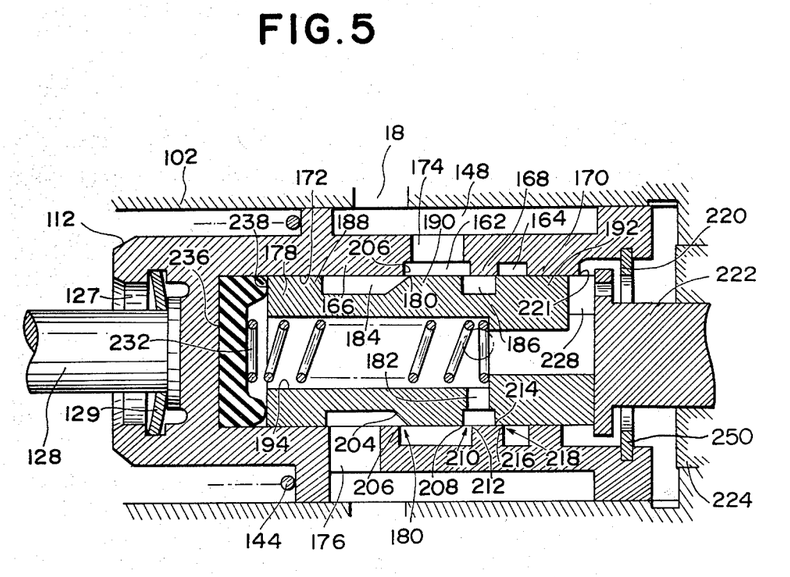
FIG. 5 is a partial longitudinal sectional view of the hydraulic booster of FIG. 2, showing the condition wherein the brake pedal is applied with a relatively light force.

As shown in FIGS. 3 and 5, the piston 112 is formed with annular recesses 162 and 164 respectively located between lands 166, 168 and 170 on the internal surface thereof. Each recess 162 and 164 opens toward a longitudinal bore 172 formed in the piston 112. The piston 112 includes radial passages 174 and 176 providing communication between the bore 172 and the longitudinal channels 148 and 160, respectively. The control valve means 178 is formed with lands 188, 190 and 192 defining annular recesses 184 and 186 and a spool valve 180 for cooperating with the piston annular recesses 162 and 164 to regulate fluid flow through the power boost apparatus. The control valve means 178 is further provided with a stepped bore 194 communicating with the recess 186 through a passage 196 and with the pressure chamber 114 through a passage 228. In the released position of the control valve, as shown in FIG. 2, the first spool valve 180 is open to permit communication between the inlet port 18 and the outlet port 48 therethrough.

The shoulder 208 of the land 190 acts as a second spool valve 210 together with the shoulder 212 of the land 168. The second spool valve 210 controls communication between the inlet port 18 and the pressure chamber 114 via the annular recess 186. The shoulder 214 of the land 192 acts as a third spool valve 218 together with the shoulder 216 of the land 170. Through the third spool valve 218, the recess 217 communicates with the exhaust chamber 116 and the fluid reservoir 10 via the passage 219 formed in the piston 112 and the drain passage 54 through the drain port 50. In the released position shown in FIG. 2, the control valve means annular recess 186 and the piston internal land opposite it are offset to establish communication between the control valve means stepped bore 194 and the piston annular recess 164. In this position, fluid communication is establish from the pressure chamber 114, through the control valve passage 228 and the stepped bore 194 to the left end of control valve means 178. In this position the control valve annular recess 186 is closed to pressurized fluid from the inlet 18, and the fluid is permitted to flow through the valve mechanism to the relief valve 312. Since pressurized fluid is precluded from flowing into the pressure chamber 114, and the pressurized fluid therein is permitted to flow through the control valve, in this released position of FIG. 2, the control valve is permitted to shift to the right, releasing the force applied to the tandem master cylinder.

The power piston 112 includes an annular connecting ring 220 at the internal surface of the end adjacent the pressure chamber 114. The ring 220 engages a flange portion 222 of an outer cylindrical member 224 slidably received in the stepped bore 110 of the housing 102.

Figure 4:
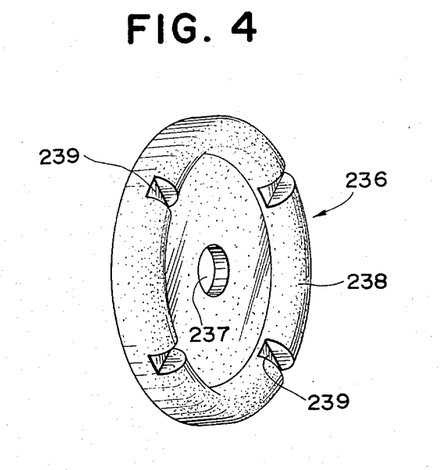
FIG. 4 is a perspective view of a resilient member showing detailed construction thereof.

A helical spring 232 is disposed within the portion 198 of the valve means bore 194 to urge the control valve toward the outer cylindrical member 224. The spring 232 normally urges the piston 112 toward the plunger member 248. One end of the spring 232 adjacent the exhaust chamber 116 is seated onto a resilient member 236 positioned in the bottom of the bore 194. As shown in FIG. 4, the resilient member 236 is formed from resilient material such as urethane rubber and is formed with an annular projective portion 238 on the surface adjacent the piston 112. The projective portion 238 is formed with radial grooves 239. The thickness of the resilient member 236 corresponds to a distance between the front end of the spool valve 178 and the bottom of the piston bore 194 at the position where the spool valve contacts the shoulder 206 to close the first valve 180. Thus, immediately after the first valve closes, the front end of the spool valve 178 engages the top of the resilient member 236 so that the force applied to the brake pedal 21 is transmitted to the tandem master cylinder through the resilient member 236. The radial grooves 239 act as passages for establishing communication between the bore 194 and the outer side of the resilient member 236 for equalizing the pressure of the fluid therebetween. The resilient member 236 is also formed with an opening 237 at the central portion thereof to establish communication between both sides of the resilient member. Both the radial grooves 239 and the central opening serve to equalize fluid pressure when the spool valve engages and deforms the resilient member.

A shoulder 221 opposing the pressure chamber 114 mates with the head 250 of the thrusting plunger member 248. When the brake pedal 21 is applied, the spool valve 210 is moved toward left in FIG. 2 with deformation of the resilient member 236. The shoulder 221 then engages the head 250 to restrict movement of the spool valve with respect to the power piston 112. In the preferred construction, the spool valve member engages the shoulder 221 so that the resilient member 236 is deformed only about 20% of its overall original thickness to prevent crushing thereof beyond its elastic limit.

On the inner surface of the bore 110 at the piston 106 an annular recess 240 is formed to receive therein an annular sealing member 242. The inner surface of the sealing member 242 contacts the outer surface of the member 224 for fluid sealing.

Referring to FIG. 3, there is shown in detail a relief valve means 300 provided in the outlet port 48 of the booster housing 102, which relief valve means is incorporated with the pressure chamber 114. Generally, the relief valve means 300 comprises a bore 302 and a valve member 304 movable therein. The bore 302 communicates with the outlet port 48 in a manner whereby the valve member 304 may shift to block fluid flow therethrough. The valve member 304 is formed with a blind bore 316, with a helical spring 318 is disposed therein to urge a pilot valve 320 upwardly as shown in the drawing. The pilot valve 320 has a generally cone-shaped head 322 which seals against an opening 324 formed in a valve seat 326 in a normally closed position. The bore 316 communicates with a pilot chamber 328 which is closed at the top by a plug 330. The pilot chamber 328 communicates with the pressure chamber 114 through a fluid passage 332 and an orifice 334.

The valve member 304 is formed with an opening 336 which communicates with the drain chamber 116 through a passage 338 formed in the booster housing. Both of the outer ends of the passages 332 and 338 are closed by a ball-shaped sealing members 340 and 342.

In operation with the brake pedal 21 released, the relationship between the power piston 112 and control valve means 178 is as illustrated in FIGS. 2 and 3, at which time hydraulic fluid is supplied through the fluid pump 12, the flow-priority valve 26 and the fluid passage 24 to the inlet port 18 of the hydraulic power booster 20. The fluid flows through the inlet port 18, channel 148, radial passage 174, recesses 162 and 184, radial passage 176, channel 160, outlet port 48, through the recess 305 formed around the outer circumference of the thrust valve member 304 and out the outlet port 48. Thus, the pressure fluid flowing through the power booster 20 is applied to the operation valve 54. The pressure fluid also flows through the channel 160, the passage 344 and into the vertical bore 302. At this time, the valve member 304 closes the thrust valve 312 to restrict fluid flow through the outlet port 48. Since the spool valve 218 is open and communicates with the exhaust chamber 116 through a passage 219, the pressure chamber 114 communicates with the pilot chamber 328 through the third spool valve 218, passage 219, exhaust chamber 116, orifice 334 and the passage 332.

If the steering wheel 62 is operated in this condition, steering load is applied to the fluid flowing through the inlet port 18, channel 148, radial passage 174, recesses 162 and 184, radial passage 176, channel 160, recess 305 and the outlet port 48. The fluid pressure is also applied to the bore 302 through the passage 344. The set force of the thrust valve 312 is determined by the force of a helical spring 319. Therefore, if the fluid pressure applied to the bore 302 exceeds this set force, the valve member 304 shifts upwardly to open. Thus, pressurized fluid flowing through the passage 344 flows out from the thrust valve 312 and the outlet port 48 to the steering system operation valve 54. At this time, the second spool valve 210 is closed to shut off pressure fluid to the pressure chamber 114, the exhaust chamber 116, the third spool valve 218 and the passage 219.

In this released position, the pressure chamber 114 communicates with the exhaust port 50 through orifices 226, passage 228, bores 194 and 196, recesses 186 and 164, radial passage 182, longitudinal channel 219 and exhaust chamber 116. Applying the pedal 21 from the released position moves the valve means 178 to the left. The first spool valve 180 shifts to reduce the amount of fluid flowing therethrough and will close the communication between the pressure chamber 114 and the exhaust port 50. The second spool valve 210 will then open communication between the pressure chamber 114 and the inlet port 18 through the orifices 226 and the various passages of the valve means 178.

In this position, the valve means 178 does not engage the resilient member 236. As the brake pedal 21 is depressed, the front end of the valve means 178 engages the projecting portion 238 of the resilient member 236. Further movement deforms the resilient member 236 until the head 250 of the thrust rod 248 engages the shoulder 221. When the head 250 engages the shoulder 221, the resilient member 236 is deformed about 20% in overall thickness. As this occurs, the second spool valve 210 opens wider, admitting more hydraulic fluid to the pressure chamber 114, building up the boost pressure therein until finally the boost force attains a predetermined value to overcome the spring 144 and thus urge the piston 112 toward the pressure chamber to shift to the position shown in FIG. 4. The outer cylindrical member 224 is connected to the piston 112 by engagement between the connecting ring 220 and the flange portion 222.

Under this condition, the valve means 178 is retained within the power piston in the predetermined relationship with deformation of the resilient member 236 and with the thrust rod head 250 engaging the land shoulder 221. In this manner, the resilient member 236 is prevented from being deformed beyond its own elastic limit. Therefore, the resilient member 236 may be repeatedly subjected to this controlled deformation and not be permanently damaged thereby.

At the same time, the fluid pressure applied to the pressure chamber 114 is also applied to the pilot chamber 328 through the passage 332, orifice 334 and a passage 335. When the fluid pressure in the pilot chamber 328 exceeds the force of the spring 318, the pilot valve 320 opens, communicating the pilot chamber 328 with the exhaust chamber 116 through the passage 338 to drain the pressure fluid therethrough. This pressure fluid is modulated as it flows through the passage 335, the orifice 334 and into the pilot chamber 328. In this position, the fluid pressure applied to the bore 302 is substantially the same as the pressure upstream of the orifice 334. Therefore, the fluid pressure differential between the bore 302 and the pilot chamber 328 shifts the valve member 304 to open the thrust valve 312 to apply fluid pressure to the steering system 56 even when the brake pedal 21 is fully applied.

In the present embodiment, when the brake pedal 21 is depressed, the thrust rod 254 urges the thrust plunger 248 to shift the control valve means 178 against the force of spring 232. The first spool valve 180 is gradually closed and the second spool valve 210 is gradually opened to direct hydraulic fluid to both the steering gear mechanism 56 and the pressure chamber 114, thereby increasing the boost pressure within the pressure chamber. When the boost force overcomes the force of the return spring 144 urging the piston toward the pressure chamber, the piston 112 shifts toward the exhaust chamber 116. If the brake pedal 21 is further depressed, the valve means 178 engages the resilient member 236 as shown in FIG. 5. In this position, the first spool valve 180 is completely closed and the second spool valve 210 is completely open to supply all of the hydraulic fluid from the pump 12 to the pressure chamber 114. Therefore, maximum boost pressure is applied to the master cylinder for rapid braking.

When the boost force is applied to the braking system of the vehicle through the master cylinder, the brake pedal becomes stiffer due to hydraulic reaction. However, the hydraulic reaction applied to the plunger 248 affects the brake pedal 21 only by the sectional area $A_1$ thereof to make the pedal stiffer. On the other hand, the power piston is subjected to a boost force corresponding to the annular sectional area $A_2-A_3+A_1$. Therefore, the ratio of boost force relative to the hydraulic reaction is $(A_2-A_3+A_1)/A_1$.

Figure 6:
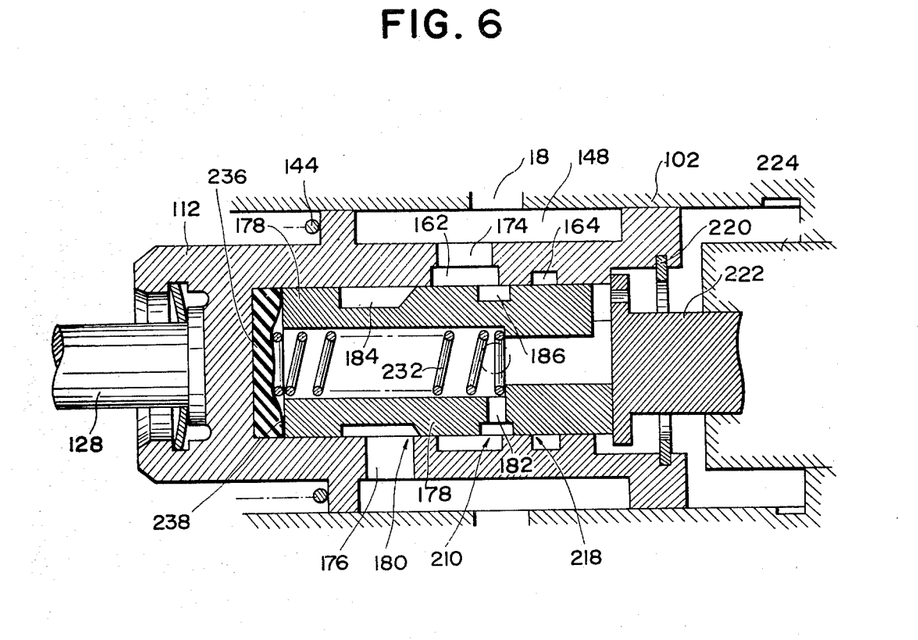
FIG. 6 is a view similar to FIG. 4, showing the brake pedal in fully applied condition.
Figure 7:
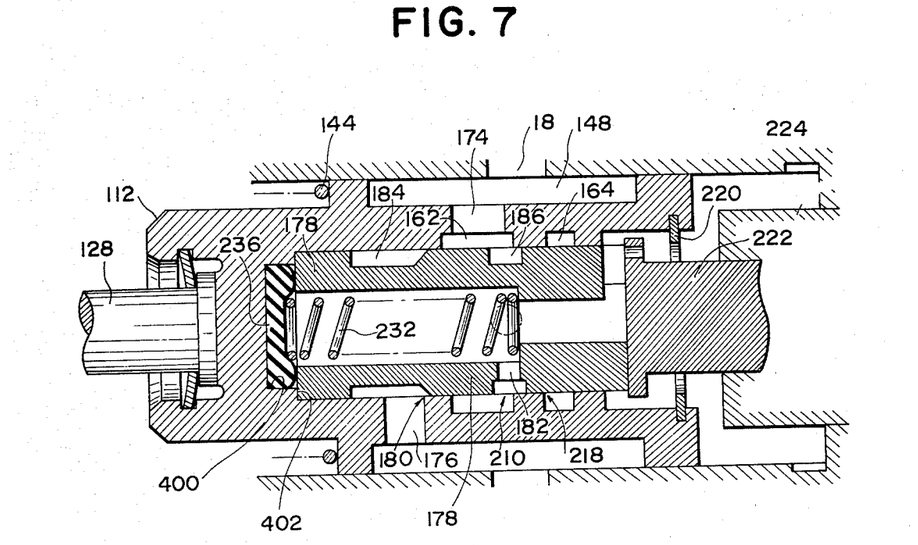
FIG. 7 is a view similar to FIG. 4, showing a modified construction of the hydraulic booster according to the present invention.

Although the present invention has been shown and described in terms of preferred embodiments, it should not be considered as limited to this. For example, the means for limiting the travel of the spool valve is not necessarily a projection protruding inwardly from the power piston bore 194. As shown in FIG. 6, the limiting means can take the form of a circular recess 400 having a diameter smaller than that of the spool valve. The resilient member having a smaller diameter than that of the member used in the previous embodiment is received within the recess 400. When the brake pedal is in the released position, the annular projection formed on the surface of the resilient member projects from the recess. The height of the resilient member projecting from the recess is about 20% of the overall thickness of the resilient member. The spool valve 178 engages an annular step 402 formed between the bore 194 and the recess 400. In this construction, the amount of spool valve travel can be limited by the top of spool valve engaging the step 402. Further variations to any particular embodiment could be made without departing from the scope of the present invention as defined solely by the accompanying claims.

What is claimed is:

1. A hydraulic power boost apparatus in a brake system for an automotive vehicle comprising:
    a booster housing communicating with a working fluid source and receiving therefrom a working fluid, which working fluid recirculates through a hydraulic circuit via said booster housing;
    a power piston slidably disposed within the interior of said booster housing and movable along the longitudinal axis of said housing, said power piston being connected with a brake master cylinder which distributes pressurized fluid to each of individual wheel cylinders, said power piston cooperating with said booster housing to define a pressure chamber within said booster housing where a boost pressure is built up, and said power piston defining therein a longitudinally extending blind bore having a bottom adjacent said master cylinder;
    an elastically deformable resilient member disposed at the bottom of said blind bore, said resilient member having a predetermined thickness;
    a valve member disposed within said power piston and cooperating therewith to connect and disconnect said pressure chamber with respect to said fluid source in response to application and release of a brake pedal, which valve member is movable from an initial position in which it is spaced from said resilient member for disconnecting said pressure chamber from said fluid source, to a first position in which it abuts against said resilient member to push said power piston towards said master cylinder to connect said pressure chamber to said fluid source, and to a second position in which it deforms said resilient member to transmit a braking force applied to said brake pedal directly to said power piston; and
    a stroke limiting means for limiting the movement of said valve means beyond said second position, thereby preventing said resilient member from being deformed beyond its elastic limit.

2. An apparatus as set forth in claim 1, wherein said resilient member is formed with a substantially dish shaped configuration having a circumferentially projecting portion and a central planar section, which projecting portion projects toward said valve member.

3. An apparatus as set forth in claim 2, wherein the motion stroke of said valve member with respect to said resilient member is limited so as not to exceed the height of said projecting portion.

4. An apparatus as set forth in claim 3, wherein said resilient member is formed with a radially extending groove in said projecting portion, which groove communicates with a central opening formed in the central planar section, said groove and central opening cooperating to provide communication between the inner and outer side of said resilient member upon said resilient member being deformed by said valve member.

5. An apparatus as set forth in claim 4, wherein said stroke limiting means comprises an edge of a stepped section formed on the internal periphery of the power piston and a flange portion radially extending from an input rod connecting said valve member with the brake pedal for transmitting the force applied to said brake pedal to said valve member.

6. An apparatus as set forth in claim 2, wherein said stroke limiting means comprises an edge of a stepped section formed on the internal periphery of said piston and the end section of said valve member adjacent to said resilient member, said end being arranged to contact said edge at the end of the valve member stroke.

7. A hydraulic power boost apparatus in a brake system for an automotive vehicle comprising:
   a substantially cylindrical booster housing having inlet and outlet ports respectively communicating with a working fluid source in order to recirculate a working fluid through said housing;
   a substantially cylindrical power piston slidably disposed within the interior of said booster housing and movable along the longitudinal axis of said booster housing, said power piston defining a blind bore adjacent a brake master cylinder and cooperating with said booster housing to define a pressure chamber within said booster housing, where a boost pressure is built up in response to application of a brake pedal, said power piston being connected with said brake master cylinder for transmitting the boost pressure thereto;
   a substantially cylindrical valve member cooperatively disposed within said power piston and movable along the longitudinal axis of said power piston, said valve member defining a plurality of communication passages to direct the flow of working fluid within the internal periphery of said power piston, said valve member being cooperatively connected with said brake pedal through an input rod so that it establishes communication between said inlet port and said pressure chamber upon said brake pedal being depressed in order to build up the boost pressure;
   a resilient member disposed within the interior of said power piston and facing one end of said valve member, said resilient member being provided with an annular projection on the surface facing said end of the valve member, said resilient member having a predetermined elastic limit beyond which it should not be compressed;
   a radially extending shoulder extending from the internal periphery of said power piston;
   a surface associated with and extending radially beyond the outer periphery of said valve member at a location opposing said shoulder, said surface being spaced from said shoulder at a given distance which limits the stroke of said valve member and thereby prevents said resilient member from being compressed beyond its elastic limit.

8. A hydraulic power boost apparatus in a brake system for an automotive vehicle comprising:
   a substantially cylindrical booster housing having an inlet port and an outlet port respectively communicating with a working fluid source in order to recirculate the working fluid therethrough;
   a substantially cylindrical power piston slidably disposed within the interior of said booster housing and movable along the longitudinal axis of said booster housing, said power piston dividing the interior of said booster housing into two chambers, one of which serves as a pressure chamber where the boost pressure is built up while a brake pedal is depressed, said power piston being cooperatively connected with a brake system master cylinder;
   a substantially cylindrical valve member cooperatively disposed within said power piston and movable along the longitudinal axis of said power piston, said valve member defining a plurality of communication passages to direct the flow of working fluid within the internal periphery of said power piston, said valve member being cooperatively connected with said brake pedal through an operating rod so that it establishes communication between said inlet port and said pressure chamber via said cylindrical valve when the brake pedal is depressed;
   a resilient member of substantially dish-shaped configuration having a circumferential projective section and central planar section, said circumferential projective section protruding toward the corresponding end of said valve member, which resilient member being disposed within said power piston and opposing to said corresponding end of said valve member so that it can be deformed by abutment of said valve member against the resilient member when the brake pedal is applied exceeding a given amount said resilient member having a predetermined elastic limit beyond which it should not be compressed by an allowable valve member stroke following contact of said resilient member by said valve member;
   a means for limiting the valve member stroke toward said resilient member, which limit is determined so that the elastic limit of said resilient member is not exceeded, said means comprising a shoulder extending radially inwardly from the internal periphery of said power piston, and a surface associated with and extending radially outwardly beyond the outer periphery of said valve member at a location opposing said shoulder, said surface being spaced from said shoulder at a given distance which establishes the allowable valve member stroke.

9. An apparatus as set forth in claims 7 or 8, wherein said predetermined valve member stroke is shorter than the length of said circumferential projective section of said resilient member.

10. An apparatus as set forth in claims 7 or 8 wherein said resilient member is formed with a radially extending groove in said projective section, which groove communicates with a central opening formed in the central plane section, said groove and central opening establishing communication between the inner and outer sides of said resilient member upon said resilient member being deformed by said valve member.

* * * * *